(12) United States Patent
Paixao Dantas et al.

(10) Patent No.: US 12,119,139 B2
(45) Date of Patent: Oct. 15, 2024

(54) PROCESS FOR THE MANUFACTURE OF AN ELECTRIC CABLE BY EXTRUSION OF A COMPOSITION BASED ON A PROPYLENE POLYMER AND ON A DIELECTRIC LIQUID

(71) Applicant: NEXANS, Courbevoie (FR)

(72) Inventors: Marcelo Paixao Dantas, Nuremberg (DE); Gabriele Perego, Milan (IT); Birane Toure, Villeurbanne (FR); Mauro Cacciotti, Latina (IT); Walid Bahloul, Villeurbanne (FR)

(73) Assignee: NEXANS, Courbevoie (FR)

( * ) Notice: Subject to any disclaimer, the term of this patent is extended or adjusted under 35 U.S.C. 154(b) by 825 days.

(21) Appl. No.: 16/635,071

(22) PCT Filed: Jul. 31, 2018

(86) PCT No.: PCT/FR2018/051964
§ 371 (c)(1),
(2) Date: Jan. 29, 2020

(87) PCT Pub. No.: WO2019/025718
PCT Pub. Date: Feb. 7, 2019

(65) Prior Publication Data
US 2021/0118595 A1    Apr. 22, 2021

(30) Foreign Application Priority Data
Aug. 1, 2017 (FR) .................................... 17 57384

(51) Int. Cl.
*H01B 13/14*  (2006.01)
*C08L 23/06*  (2006.01)
*C08L 23/12*  (2006.01)
*H01B 3/20*   (2006.01)
*H01B 3/44*   (2006.01)

(52) U.S. Cl.
CPC ............ *H01B 13/147* (2013.01); *C08L 23/06* (2013.01); *C08L 23/12* (2013.01); *H01B 3/20* (2013.01); *H01B 3/441* (2013.01); *H01B 13/14* (2013.01)

(58) Field of Classification Search
CPC .......... H01B 13/14; H01B 3/441; H01B 3/20; H01B 13/147; C08L 23/12; C08L 23/06
See application file for complete search history.

(56) References Cited

U.S. PATENT DOCUMENTS 4,564,349 A * 1/1986 Brown .................... B29B 7/726
                                                    425/207
2004/0091631 A1   5/2004 Belli et al.
(Continued)

FOREIGN PATENT DOCUMENTS

WO    2013/171550    11/2013

OTHER PUBLICATIONS

Chilean Office Action dated Jan. 15, 2021.
International Search Report dated Oct. 15, 2018.

*Primary Examiner* — Vishal I Patel
(74) *Attorney, Agent, or Firm* — Sofer & Haroun, LLP

(57) ABSTRACT

The invention relates to a process for the manufacture of an electric cable comprising an extruded thermoplastic layer obtained from a composition comprising at least one dielectric liquid and at least one thermoplastic polymer chosen from a propylene homopolymer and copolymer, and also to a cable obtained by said process.

17 Claims, 1 Drawing Sheet

(56) References Cited

U.S. PATENT DOCUMENTS

| | | | |
|---|---|---|---|
| 2007/0248748 A1* | 10/2007 | Balconi | H01B 13/14 |
| | | | 425/130 |
| 2015/0221420 A1* | 8/2015 | Perego | H01B 13/14 |
| | | | 264/171.13 |
| 2017/0006941 A1 | 3/2017 | Nexans | |
| 2018/0362749 A1 | 12/2018 | Nexans | |
| 2020/0028360 A1 | 9/2020 | Nexans | |

* cited by examiner

PROCESS FOR THE MANUFACTURE OF AN ELECTRIC CABLE BY EXTRUSION OF A COMPOSITION BASED ON A PROPYLENE POLYMER AND ON A DIELECTRIC LIQUID

RELATED APPLICATION

This application is a National Phase of PCT/FR2018/051964 filed on Jul. 31, 2018, which in turn claims priority to French Patent Application No. 17 57384, filed on Aug. 1, 2017, the entirety of which is incorporated by reference.

FIELD OF THE INVENTION

The invention relates to a process for the manufacture of an electric cable, in particular of the power cable type, comprising an extruded thermoplastic layer obtained from a composition comprising at least one dielectric liquid and at least one thermoplastic polymer chosen from a propylene homopolymer and copolymer, and also to a cable obtained by said process.

It typically, but not exclusively, applies to electric cables intended for power transmission, in particular medium-voltage power cables (in particular from 6 to 45-60 kV) or high-voltage power cables (in particular greater than 60 kV, and which can range up to 400 kV), whether they are in direct current or alternating current, in the fields of overhead, undersea or underground electricity transmission, or alternatively of aeronautics.

DESCRIPTION OF THE RELATED ART

A medium- or high-voltage power transmission cable generally comprises, from the inside towards the outside:
- an elongated electrically conducting element, in particular made of copper or of aluminium;
- an internal semiconducting layer surrounding said elongated electrically conducting element;
- an electrically insulating layer surrounding said internal semiconducting layer;
- an external semiconducting layer surrounding said insulating layer; and
- optionally, an electrically insulating protective sheath surrounding said external semiconducting layer.

In particular, the electrically insulating layer can be a polymer layer based on a crosslinked polyolefin, such as a crosslinked polyethylene (XLPE) or a crosslinked ethylene/propylene or ethylene/propylene/diene elastomer. The crosslinking is generally carried out during the stage of extrusion of the polymer composition around the elongated electrically conducting element. The use of a crosslinked polyolefin makes it possible to provide a layer which exhibits satisfactory electrical and mechanical properties and to result in a cable which can function at a temperature of greater than 70° C., indeed even equal to 90° C. However, several problems are encountered. Firstly, the crosslinked materials cannot be recycled. Secondly, the crosslinking process limits the rate of manufacture of the cables comprising an XLPE-based insulating layer. This is because, in order to obtain a satisfactory degree of crosslinking, it is necessary for the polymer to be able to be brought to the temperature required in order to obtain the crosslinking thereof for a sufficiently long period of time. Thus, the rate of production of the cables comprising an XLPE-based insulating layer has to be adjusted so that the passage time in the crosslinking tunnel is long enough to obtain a satisfactory degree of crosslinking, which represents a not insignificant restrictive limit in terms of production capacity. Furthermore, the crosslinking reactions must under no circumstances take place during the extrusion of the polyethylene-based material so as to avoid any risk of formation of XLPE particles in the extruder (screw, collar, head of the extruder), which particles might subsequently migrate into the insulating layer or into the semiconducting layer of the cable and create defects therein. This is because the presence of XLPE particles affects the final properties of the cable in so far as these particles result in a lack of homogeneity, mainly of the material of the insulating layer or else at the interface between the insulating layer and the semiconducting layers. This phenomenon is known under the name of "scorch phenomena".

The use of LDPE-based materials for the insulating layers of cables can be an alternative to the use of XLPE-based materials. However, LDPE-based materials exhibit the disadvantage of not being able to be used at temperatures of greater than 70° C., which also has the consequence of reducing their ability to transmit power so as to avoid any overheating of the insulating layer at temperatures of greater than 70° C.

It is also known to manufacture an electrically insulating layer composed of several strips of paper or of a paper/polypropylene composite impregnated with a large amount of dielectric liquid (e.g. cable containing paper impregnated with oil). The dielectric liquid completely fills the empty spaces present in the layer and prevents partial discharges and damage to the insulation of the cable. However, the manufacture of this type of electrically insulating layer is very complex and expensive (stage of application of the strips or of the composite and stage of impregnation).

Furthermore, power cables comprising at least one extruded thermoplastic electrically insulating layer based on a composition comprising a polypropylene matrix intimately mixed with a dielectric liquid have been provided, such as, for example, in International Application WO 02/03398. The dielectric liquid can represent from 3% to 15% by weight, with respect to the total weight of the composition. For the industrial production of such power cables, it is necessary to develop a process which makes possible the homogeneous and intimate mixing of the polypropylene matrix with the dielectric liquid while guaranteeing that this mixture is easy to extrude. However, although the presence of the dielectric liquid can make possible an improvement in the electric performance qualities of said cables, in particular in terms of dielectric stiffness, it can also cause problems during the extrusion process in their industrial manufacture. This is because the presence of the dielectric liquid, in particular when it is injected during the first extrusion stages, can cause irregularities in the movement and the plasticizing of the polypropylene matrix along the barrel of the extruder. Furthermore, when amounts of less than 15% by weight of dielectric liquid (e.g. approximately 3%-10%), with respect to the total weight of the composition, are used, a phenomenon of sliding at the wall related to the lubricating effect of the dielectric liquid (well known under the term "slippage/sliding phenomenon") appears, which can result in a deterioration in the mechanical and/or electrical properties of the thermoplastic layer obtained at the extruder head (structural defects of the layer).

In addition, International Application WO 2005/042226 has described an extrusion process comprising the following stages: a first stage during which a thermoplastic propylene-based polymer in the solid form is introduced into a feed zone of an extruder, a second stage during which the thermoplastic polymer is conveyed from the feed zone towards at least one intermediate zone which makes possible the gradual melting of the thermoplastic polymer and then a stage of injection of a dielectric liquid into a zone of the extruder adjacent to the extruder head and in which the thermoplastic polymer is in the molten state. This process exhibits the disadvantage of injecting the dielectric liquid, which is a flammable liquid, at high pressures (approximately 30-1500 bars) and in a zone close to the extruder head, which results in major safety problems and in damage to the injection device and/or to the extruder.

Thus, the aim of the present invention is to overcome the disadvantages of the prior art and to provide a process for the manufacture of an electric cable, in particular of the power cable type, comprising at least one elongated electrically conducting element at least one extruded thermoplastic layer surrounding said elongated electrically conducting element, said layer being obtained from a composition comprising at least one dielectric liquid and at least one thermoplastic polymer based on a propylene homo- or copolymer, said process being simple, economical, not requiring the installation of a complex and expensive safety device and being able to result in an electrically insulating thermoplastic layer exhibiting good electrical and mechanical properties, at least comparable to those obtained with an XLPE crosslinked layer.

OBJECTS AND SUMMARY

The aim is achieved by the invention which will be described below.

A first subject-matter of the invention is a process for the manufacture of an electric cable, in particular of the power cable type, comprising at least one elongated electrically conducting element and at least one extruded thermoplastic layer surrounding said elongated electrically conducting element, said process employing a device comprising at least one extruder containing a barrel, a screw and an extruder head, characterized in that it comprises at least the following stages:
  i) a stage of introduction, in particular at ambient temperature, of a composition comprising:
    at least one thermoplastic polymer in the solid form chosen from a propylene homopolymer and a propylene copolymer, and
    at least one dielectric liquid, said dielectric liquid representing an amount of less than 15% by weight approximately, with respect to the total weight of the composition,
into a first zone of the screw, denoted feed zone, located at the inlet of the extruder,
  ii) a stage during which the composition resulting from stage i) is conveyed from the feed zone towards one or more intermediate zones of the screw, making possible the transportation of the composition towards the head of the extruder located at the outlet of the extruder and the gradual melting of the thermoplastic polymer, and
  iii) a stage of application, at the head of the extruder, of the composition resulting from stage ii) around the elongated electrically conducting element, and
in that the barrel is a grooved barrel and/or the screw is a screw of "barrier" type (i.e. barrier screw).

The process of the invention is simple and economical and it makes it possible to prevent any safety problem related to the injection of a dielectric liquid at high pressure and any problem of wall sliding, while guaranteeing a homogeneous and intimate mixing of the thermoplastic polymer and of the dielectric liquid.

An extruder conventionally comprises a barrel (or cylinder) in which will rotate one or more screws driven in rotation, in particular by a variable-speed motor. The screw (s) extend along the longitudinal axis of the extruder and are driven in rotation around their longitudinal axis.

In the process of the present invention, the use of a specific barrel (i.e. grooved barrel) and/or of a specific screw (i.e. barrier screw) makes it possible to obtain a homogeneous composition which is easy to extrude, while preventing or limiting the formation of structural defects in the thermoplastic layer obtained, in particular of the electrically insulating layer type.

The extruder used in the process of the invention makes it possible to carry out stages i), ii) and iii). In particular, it makes it possible to convey the composition of stage i), to disperse it or to homogenize it, to place it under pressure, to melt the thermoplastic polymer and to form a thermoplastic layer, in particular of the electrically insulating layer type, around at least one elongated electrically conducting element.

In the present invention, the expression "ambient temperature" means a temperature varying from 15 to 30° C. approximately and preferably varying from 20 to 25° C. approximately.

According to one embodiment of the invention, the extruder employing the process of the invention is a single-screw extruder. It thus comprises a single screw.

The propylene copolymer of the composition of stage i) can be a heterophasic propylene copolymer, a random propylene copolymer or one of their mixtures.

The heterophasic propylene copolymer generally comprises a thermoplastic phase of propylene type and an elastomer phase of copolymer of ethylene and of an $\alpha^1$-olefin type.

The elastomer phase of the heterophasic copolymer can represent at least 20% by weight approximately, and preferably at least 45% by weight approximately, with respect to the total weight of the heterophasic copolymer.

The $\alpha^1$-olefin of the elastomer phase of the heterophasic copolymer can be propylene.

Mention may be made, as example of this type of copolymer, of the heterophasic copolymer sold by Basell Polyolefins under the reference Adflex® Q 200 F.

The random propylene copolymer can be a copolymer of propylene and of olefin, the olefin being chosen in particular from ethylene and an $\alpha^2$-olefin other than propylene.

The $\alpha^2$-olefin other than propylene can correspond to the formula $CH_2=CH-R^1$, in which $R^1$ is a linear or branched alkyl group having from 2 to 10 carbon atoms, in particular chosen from the following olefins: 1-butene, 1-pentene, 4-methyl-1-pentene, 1-hexene, 1-octene, 1-decene, 1-dodecene and one of their mixtures.

The $\alpha^2$-olefin preferably represents at most 15 mol % approximately and more preferably at most 10 mol % approximately of the copolymer.

A copolymer of propylene and of ethylene is preferred as random propylene copolymer.

By way of example, preference is very particularly given to the random propylene copolymer sold by Borealis under the reference Bormed® RB 845 MO.

The random propylene copolymers which can be used according to the invention preferably have an elastic modulus ranging from 600 to 1200 MPa approximately.

The propylene homopolymers which can be used according to the invention preferably have an elastic modulus ranging from 1250 to 1600 MPa approximately.

The homopolymer (respectively the random propylene copolymer) can have a melting point of greater than 130° C. approximately, preferably of greater than 140° C. approximately, and more preferably ranging from 140° C. to 165° C. approximately.

The homopolymer (respectively the random propylene copolymer) can have an enthalpy of fusion ranging from 30 to 100 J/g approximately.

The homopolymer (respectively the random propylene copolymer) can have a melt flow index ranging from 0.5 to 3 g/10 min approximately, measured at 230° C. approximately with a load of 2.16 kg approximately according to Standard ASTM D1238-00.

The composition of stage i) can additionally comprise a polyethylene in the solid form.

Said dielectric liquid represents an amount of less than 15% by weight, with respect to the total weight of the composition of stage i).

The polythene is preferably a high-density polyethylene or a linear low-density polyethylene.

A "high-density" polyethylene or HDPE according to Standard ISO 1183A (at a temperature of 23° C.) has a density varying from 0.930 to 0.970 g/cm$^3$ approximately, and more preferentially still from 0.940 to 0.965 g/cm$^3$ approximately.

A linear "low-density" polyethylene or LLDPE according to Standard ISO 1183A (at a temperature of 23° C.) has a density ranging from 0.91 to 0.925 g/cm$^3$ approximately.

The propylene homopolymer can represent from 40% to 90% by weight approximately and preferably from 40% to 70% by weight approximately, with respect to the total weight of the composition of stage i).

The random propylene copolymer can represent from 40% to 90% by weight approximately and preferably from 40% to 70% by weight approximately, with respect to the total weight of the composition of stage i).

The heterophasic propylene copolymer can represent from 5% to 60% by weight approximately and preferably from 5% to 50% by weight approximately, with respect to the total weight of the composition of stage i).

The polyethylene can represent from 20% to 60% by weight approximately and preferably from 20% to 50% by weight approximately, with respect to the total weight of the composition of stage i).

According to a preferred embodiment of the invention, the composition comprises, as polymers:
  a random propylene copolymer (e.g. of 50-70% by weight approximately, with respect to the total weight of the composition), a heterophasic propylene copolymer (e.g. of 5-30% by weight approximately, with respect to the total weight of the composition) and a linear low-density polyethylene (e.g. of 20-40% by weight approximately, with respect to the total weight of the composition), or
  a heterophasic propylene copolymer (e.g. of 35-55% by weight approximately, with respect to the total weight of the composition) and a high-density polyethylene (e.g. of 35-55% by weight approximately, with respect to the total weight of the composition).

Such combinations of polymers in association with the dielectric liquid make it possible to obtain a thermoplastic layer, in particular of the electrically insulating layer type, exhibiting good mechanical properties, in particular in terms of elastic modulus, and good electrical properties.

As the polymers of the composition are in the solid form, they can be in the form of pellets or of granules.

The composition of stage i) can additionally comprise one or more additives.

The additives are well known to a person skilled in the art and can be chosen from antioxidants, UV stabilizers, flame retardants, colourants, copper scavengers, water-treeing inhibitors and one of their mixtures.

The composition can typically comprise from 0.01% to 5% by weight approximately and preferably from 0.1% to 2% by weight approximately of additives, with respect to the total weight of the composition of stage i).

More particularly, the antioxidants make it possible to protect the composition from the thermal stresses generated during the stages of manufacture of the cable or operation of the cable.

The antioxidants are preferably chosen from hindered phenols, thioesters, sulfur-based antioxidants, phosphorus-based antioxidants, amine-type antioxidants and one of their mixtures.

Mention may be made, as examples of hindered phenols, of pentaerythritol tetrakis(3-(3,5-di(tert-butyl)-4-hydroxyphenyl)propionate) (Irganox® 1010), octadecyl 3-(3,5-di(tert-butyl)-4-hydroxyphenyl)propionate (Irganox® 1076), 1,3,5-trimethyl-2,4,6-tris(3,5-di(tert-butyl)-4-hydroxybenzyl)benzene (Irganox® 1330), 4,6-bis(octylthiomethyl)-o-cresol (Irgastab® KV10), 2,2'-thiobis(6-(tert-butyl)-4-methylphenol) (Irganox® 1081), 2,2'-thiodiethylene bis[3-(3,5-di(tert-butyl)-4-hydroxyphenyl)propionate] (Irganox® 1035), 2,2'-methylenebis(6-(tert-butyl)-4-methylphenol), 1,2-bis(3,5-di(tert-butyl)-4-hydroxyhydrocinnamoyl)hydrazine (Irganox® MD 1024) and 2,2'-oxamidobis(ethyl 3-(3,5-di(tert-butyl)-4-hydroxyphenyl)propionate).

Mention may be made, as examples of thioesters, of didodecyl 3,3'-thiodipropionate (Irganox® PS800), distearyl thiodipropionate (Irganox® PS802) and 4,6-bis(octylthiomethyl)-o-cresol (Irganox® 1520).

Mention may be made, as examples of sulfur-based antioxidants, of dioctadecyl 3,3'-thiodipropionate and didodecyl 3,3'-thiodipropionate.

Mention may be made, as examples of phosphorus-based antioxidants, of tris(2,4-di(tert-butyl)phenyl) phosphite (Irgafos® 168) and bis(2,4-di(tert-butyl)phenyl) pentaerythritol diphosphite (Ultranox® 626).

Mention may be made, as examples of amine-type antioxidants, of phenylenediamines (e.g., 1PPD or 6PPD), diphenylamine styrenes, diphenylamines, mercaptobenzimidazoles and polymerized 2,2,4-trimethyl-1,2-dihydroquinoline (TMQ).

Mention may be made, as examples of mixtures of antioxidants, of Irganox B 225, which comprises an equimolar mixture of Irgafos 168 and Irganox 1010 as are described above.

The dielectric liquid can represent from 3% to 10% by weight approximately, preferably from 4% to 8% by weight approximately and more preferably from 5% to 7% by weight approximately, with respect to the total weight of the composition.

During stage i), the pressure can be at most 5 bars, preferably at most 3 bars, and preferably at most 1.5 bars. In a particularly preferred embodiment, the pressure during stage i) is approximately equal to atmospheric pressure, namely approximately equal to 1 bar.

Stage i) makes it possible to introduce the composition into the extruder.

The feed zone or first zone of the screw is located at the inlet of the extruder. During stage i), the composition comprising the thermoplastic polymer in the solid form and the dielectric liquid is introduced into the feed zone of the screw, in particular in order to pass into the space located between the internal surface of the barrel and the external surface of the screw. In other words, during stage i), the dielectric liquid is introduced at the same time as the thermoplastic polymer in the solid form into the feed zone, through the hopper of the extruder.

The extruder preferably comprises a single zone for introduction of the composition along its longitudinal axis, this introduction zone being located in the feed zone or first zone of the screw.

A barrier screw or screw having a barrier profile comprises at least one zone denoted "barrier zone". The barrier zone comprises in particular a secondary thread with a slightly greater pitch (progressively sweeping the width of the channel) which makes it possible to separate the molten polymer from the polymer which is still solid, as if it marked the frontier between the two phases. The height of this screw is lower than that of the main thread, in order to make it possible for the molten polymer to change channel, but remains sufficiently great to prevent the solid polymer (e.g. granules) from crossing this gap.

The barrier screw can have a nominal diameter D varying from 45 to 200 mm approximately.

According to a preferred embodiment of the invention, the barrier screw exhibits an L/D ratio varying from 20 to 26 approximately, L denoting the length of the screw in mm and D the nominal diameter of the screw in mm.

The diameter of the body of the barrier screw preferably increases from the rear or from the inlet of the extruder (i.e. feed zone of the screw) towards the front or the outlet of the extruder (extruder head), either over the entire length of the screw or over parts only of the screw.

According to a preferred embodiment of the invention, the first zone or feed zone of the screw exhibits a length varying from 1 D to 3 D approximately.

The screw pitch in the feed zone can be D/2 approximately.

The thickness of the thread in the feed zone can be D/10 approximately.

In a preferred embodiment, the diameter of the body of the screw in the feed zone is constant.

In a preferred embodiment, the depth of the channel of the screw in the feed zone (at the inlet and at the outlet of the feed zone) varies from D/20 to D/10 approximately.

In the present invention, the term "grooved barrel" is understood to mean a barrel comprising at least one grooved part or, in other words, a part having grooves.

The grooved part of the barrel is preferably found in the feed zone of the screw.

According to a particularly preferred embodiment of the invention, during stage i), the composition is introduced directly into a first zone of the feed zone, known as introduction zone, and then the composition is conveyed from the introduction zone towards a second zone of the feed zone, in the direction of the head of the extruder.

The grooved part of the barrel is then more particularly found in the second zone of the feed zone.

The grooved barrel preferably comprises from 4 to 10 heating zones and from 4 to 10 cooling zones, and more preferably from 5 to 7 heating zones and from 5 to 7 cooling zones.

The grooved barrel can have an internal diameter varying from 45 to 200 mm approximately.

In the grooved part, the grooves can be straight (in the axis of the extruder) or helical.

The grooves can be rectangular, conical (triangular) or circular in shape and are preferably triangular conical in shape.

The grooves can have a length varying from 1.5 D to 2.5 D approximately.

The grooves can have a width varying from 1 to 4 mm approximately.

The grooves preferably have a depth varying from 0.2 to 3 mm approximately.

According to one embodiment of the invention, the grooves have an angle of 45°, 60°, 90° or 120°, and preferably of 90°.

The angle of the grooves can in particular be defined by the helical angle of a spiral groove, measured from the plane perpendicular to the longitudinal axis of the barrel. More particularly, grooves parallel with the longitudinal axis of the barrel have an angle of 90°.

The grooved barrel can comprise from 6 to 24 grooves and preferably from 14 to 22 grooves.

The grooves of the barrel preferably extend longitudinally along the direction proceeding from the feed zone towards the extruder head.

The barrel can have a length varying from 20 D to 26 D approximately.

Stage i) can be carried out by means of a feed hopper. The device then additionally comprises a feed hopper.

When a feed hopper is used, the hopper comprising the composition of stage i) opens out onto the barrel at the inlet of the screw and more particularly onto the first zone of the feed zone.

Stage ii)

During stage ii), the composition resulting from stage i) is extruded. It is conveyed (continuously) from the feed zone towards one or more intermediate zones of the screw making possible the transportation of the composition towards the head of the extruder located at the outlet of the extruder and the gradual melting of the thermoplastic polymer.

The intermediate zones can comprise one or more heating zones, making it possible to control the temperature in the extruder.

The molten state (fusion) is reached when the thermoplastic polymer, optionally as a mixture with other polymers, is heated to a temperature greater than or equal to its melting point.

The temperature during stage ii) can vary from 60 to 200° C. approximately.

The pressure during stage ii) can vary from 1 to 300 bars.

The intermediate zones are located between the feed zone and the extruder head.

The screw of the extruder can be divided into four zones, the first zone being the feed zone as defined above, the second, third and fourth zones being the one or more intermediate zones making possible the transportation of the composition towards the head of the extruder located at the outlet of the extruder and the gradual melting of the thermoplastic polymer.

When a barrier screw is used, the extruder comprises at least one barrier zone as defined above. In other words, at least one of the intermediate zones is a barrier zone.

According to a preferred embodiment of the invention, the second zone of the screw is a compression zone.

The compression zone preferably exhibits a length varying from 4 D to 8 D approximately.

The screw pitch in the compression zone can be 1 D approximately.

The thickness of the thread in the compression zone can vary from D/10 to D/15 approximately.

In a preferred embodiment, the diameter of the body of the screw in the compression zone is not constant. In particular, it increases from the rear or inlet of the screw towards the front or outlet of the screw (i.e. in the direction from the feed zone towards the extruder head).

In a preferred embodiment, the depth of the channel of the screw in the compression zone (at the inlet and at the outlet of the compression zone) varies from D/20 to D/10 approximately.

According to a preferred embodiment of the invention, the third zone is a barrier zone.

The barrier zone preferably exhibits a length varying from 4 D to 10 D approximately.

The screw pitch in the barrier zone can vary from D/2 to 1.5 D approximately.

The thickness of the thread in the barrier zone can vary from D/10 to D/15 approximately.

In a preferred embodiment, the diameter of the body of the screw in the barrier zone is not constant. In particular, it increases from the rear or the inlet of the screw towards the front or the outlet of the screw (i.e. in the direction from the feed zone towards the extruder head).

In a preferred embodiment, the depth of the channel of the screw in the barrier zone (at the inlet and at the outlet of the barrier zone and for the main channel and the secondary channel) varies from D/20 to D/10 approximately.

According to a preferred embodiment of the invention, the fourth zone is a pumping zone.

The pumping zone preferably exhibits a length varying from 2 D to 6 D approximately.

The screw pitch in the pumping zone can be 1 D approximately.

The thickness of the thread in the pumping zone can vary from D/10 to D/15 approximately.

In a preferred embodiment, the diameter of the body of the screw in the pumping zone is constant.

In a preferred embodiment, the depth of the channel of the screw in the pumping zone (at the inlet and at the outlet of the pumping zone) varies from D/20 to D/10 approximately.

According to a preferred embodiment of the invention, the degree of compression varies from 1.2 to 1.6 approximately, the degree of compression being defined as the ratio of the depth of the rear channel of the screw (i.e. at the inlet of the extruder or in the feed zone of the screw) to the depth of the front channel of the screw (i.e. at the outlet of the extruder or in the pumping zone of the screw).

Stage iii)

The process of the invention makes it possible to produce an electric cable with a production rate varying from 1 to 30 m/min approximately.

During stage iii), the composition comprising the thermoplastic polymer in the molten state and the dielectric liquid passes under pressure through a die, in order to be applied around the elongated electrically conducting element.

Stage $i_0$)

The process can additionally comprise, before stage i), a stage $i_0$) in which the thermoplastic polymer in the solid form chosen from a propylene homopolymer and a propylene copolymer is brought into contact, in particular at ambient temperature, with the dielectric liquid in order to form the composition of stage i) (i.e. a composition comprising the thermoplastic polymer and the dielectric liquid, said dielectric liquid representing an amount of less than 15% by weight, with respect to the total weight of the composition).

During stage $i_0$), the pressure can be at most 5 bars, preferably at most 3 bars, and preferably at most 1.5 bars. In a particularly preferred embodiment, the pressure during stage $i_0$) is approximately equal to atmospheric pressure, namely approximately equal to 1 bar.

Stage $i_0$) can be carried out directly in a feed hopper as defined in the invention or in a mixer, in particular located upstream of the feed hopper, the mixer preferably being a static mixer.

When stage $i_0$) (i.e. the contacting) is carried out in a feed hopper, the thermoplastic polymer and the dielectric liquid can be introduced separately, or in the form of a mixture, into the feed hopper.

In particular, stage $i_0$) can comprise any one of the following sequences $S^{o1}$ or $S^{o2}$:

$S^{o1}$: feeding the feed hopper with the thermoplastic polymer in the solid form and the dielectric liquid (by injection), simultaneously, or $S^{o2}$: feeding the feed hopper with the thermoplastic polymer in the solid form and with the dielectric liquid (by injection), the polymer and the dielectric liquid being added to the feed hopper at different stages, or in other words non-simultaneously.

When stage $i_0$) is carried out in the mixer, the device additionally comprises a mixer, in particular located upstream of the feed hopper, the mixer preferably being a static mixer.

In this embodiment, the thermoplastic polymer and the dielectric liquid can be introduced separately into the mixer and then the resulting composition can be transferred into the feed hopper. This embodiment makes it possible to improve the homogeneity of the composition comprising the thermoplastic polymer in the solid form and the dielectric liquid.

Stage $i_0$) can then comprise any one of the following sequences $S'^{o1}$ or $S'^{o2}$:

$S'^{o1}$: feeding the mixer with the thermoplastic polymer in the solid form and then injecting the dielectric liquid into the mixer comprising the thermoplastic polymer, or $S'^{o2}$: injecting the dielectric liquid into the static mixer and then feeding the mixer comprising the dielectric liquid with the thermoplastic polymer in the solid form, stage $S'^{o1}$ or stage $S'^{o2}$ being followed by a stage of transfer of the resulting composition into the feed hopper.

When the composition of stage i) comprises other polymers than the thermoplastic polymer in the solid form chosen from a propylene homopolymer and a propylene copolymer, stage $i_0$) brings at least one thermoplastic polymer in the solid form chosen from a propylene homopolymer and a propylene copolymer, and other polymers in the solid form, into contact, in particular at ambient temperature, with a dielectric liquid, in order to form a composition comprising the thermoplastic polymer in the solid form, the other polymers in the solid form and the dielectric liquid, said dielectric liquid representing an amount of less than 15% by weight, with respect to the total weight of the composition.

Stage $i_0$) is preferably not a stage of impregnation of the thermoplastic polymer with the dielectric liquid. In other words, the dielectric liquid is not completely absorbed by the thermoplastic polymer during stage $i_0$). This is because a conventional impregnation stage is lengthy and requires a minimum amount of dielectric liquid (10-15% approximately, with respect to the total weight of the composition).

In the process of the invention, it is particularly preferred to have a grooved barrel and a barrier screw.

Other Stages

The process can additionally comprise a stage iv) of cooling the cable obtained on conclusion of stage iii) (i.e. at the outlet of the extruder).

The cooling can be carried out with water, especially with one or more cooling tanks continuously fed with water, in particular in order to retain a constant temperature of the cooling tanks.

The process can additionally comprise a stage v) of drying the cable obtained on conclusion of stage iv). The drying makes it possible to remove the water from the surface of the cable.

The process of the invention is preferably a continuous process.

The process of the invention preferably does not comprise a stage of homogenization of the composition when the thermoplastic polymer is in the molten state. The extruder especially does not comprise a mixer, and in particular does not comprise a static mixer, making possible such a homogenization, in particular in one of the intermediate zones as defined above.

The thermoplastic layer, in particular of the electrically insulating layer type, of the cable obtained according to the process of the invention exhibits a thickness which can vary as a function of the type of cable envisaged. In particular, when the cable is a medium-voltage cable, the thickness of the insulating layer is typically from 4 to 5 mm approximately and more particularly 4.5 mm approximately. When the cable is a high-voltage cable, the thickness of the insulating layer typically varies from 17 to 18 mm (for voltages of the order of 150 kV approximately) and can range up to thicknesses ranging from 20 to 25 mm approximately for voltages of greater than 150 kV (very-high-voltage cables).

In the present invention, the term "electrically insulating layer" is understood to mean a layer, the electrical conductivity of which can be at most $1.10^{-9}$ S/m and preferably at most $1.10^{-10}$ S/m (siemens per metre) (at 25° C.).

The elongated electrically conducting element can be a single-part conductor, such as, for example, a metal wire, or a multipart conductor, such as a plurality of metal wires which are or are not twisted.

The elongated electrically conducting element can be made of aluminium, of aluminium alloy, of copper, of copper alloy and of one of their combinations.

In the present invention, the electrically insulating layer of the cable is non-crosslinked.

The electrically insulating layer is preferably a recyclable layer.

According to a preferred embodiment of the process of the invention, the electric cable can comprise:
- a first semiconducting layer surrounding the elongated electrically conducting element,
- an electrically insulating layer surrounding the first semiconducting layer, said electrically insulating layer being as defined in the invention, and
- a second semiconducting layer surrounding the electrically insulating layer.

In the present invention, the term "semiconducting layer" is understood to mean a layer, the electrical conductivity of which can be at least $1.10^{-9}$ S/m (siemens per metre), preferably at least $1.10^{-3}$ S/m, and preferably can be less than $1.10^{3}$ S/m (at 25° C.).

In a specific embodiment, the first semiconducting layer, the electrically insulating layer and the second semiconducting layer constitute a three-layer insulation. In other words, the electrically insulating layer is in direct physical contact with the first semiconducting layer, and the second semiconducting layer is in direct physical contact with the electrically insulating layer.

The first and the second semiconducting layers are preferably made of a thermoplastic polymer material.

The cable can additionally comprise an electrically insulating sheath surrounding the second semiconducting layer, and which can be in direct physical contact with the latter.

The cable can additionally comprise a metal shield surrounding the second semiconducting layer. In this case, the electrically insulating sheath surrounds said metal shield.

This metal shield can be a "wire" shield composed of an assembly of conductors made of copper or aluminium arranged around and along the second semiconducting layer, a "strip" shield composed of one or more conductive metal strips made of copper or aluminium optionally positioned helically around the second semiconducting layer or of a conductive metal strip made of aluminium positioned longitudinally around the second semiconducting layer and rendered leaktight by virtue of adhesive in the overlap regions of parts of said strip, or a "leaktight" shield of metal tube type optionally composed of lead or of lead alloy and surrounding the second semiconducting layer. This last type of shield makes it possible in particular to form a barrier to moisture which has a tendency to penetrate radially into the electric cable.

The metal shield of the electric cable of the invention can comprise a "wire" shield and a "leaktight" shield or a "wire" shield and a "strip" shield.

All the types of metal shields can play the role of earthing the electric cable and can thus transmit fault currents, for example in the event of a short circuit in the network concerned.

Other layers, such as layers which swell in the presence of moisture, can be added between the second semiconducting layer and the metal shield, between the metal shield and the electrically insulating sheath, when they exist, these layers making it possible to provide the longitudinal watertightness of the electric cable.

A second subject-matter of the invention is an electric cable, in particular of the power cable type, comprising at least one elongated electrically conducting element and at least one extruded thermoplastic layer surrounding said elongated electrically conducting element, characterized in that it is capable of being obtained according to a manufacturing process in accordance with the first subject-matter of the invention.

The thermoplastic layer, in particular of the electrically insulating layer type, is obtained by extrusion of a composition comprising at least one thermoplastic polymer, chosen from a propylene homopolymer and a propylene copolymer, and a dielectric liquid, said dielectric liquid representing an amount of less than 15% by weight, with respect to the total weight of said composition.

The composition, the thermoplastic polymer and the dielectric liquid are as defined in the first subject-matter of the invention.

BRIEF DESCRIPTION OF THE DRAWINGS

Other characteristics and advantages of the present invention will become apparent in the light of the non-limiting FIGS. 1 and 2 which diagrammatically represent a device implementing the process according to the invention (FIG. 1) and an electric cable according to the invention (FIG. 2).

DETAILED DESCRIPTION

For reasons of clarity, only the components essential for the understanding of the invention have been represented diagrammatically in these figures, this being done without observing a scale.

Figure 1:
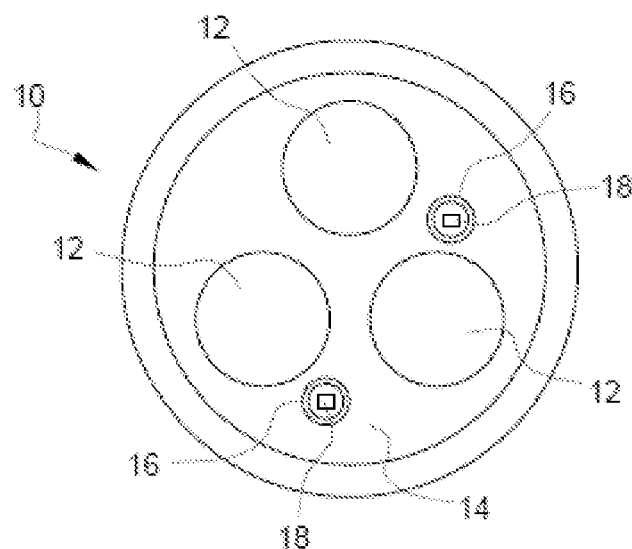

In FIG. 1, the device 1 comprises a container 2 which can be fed with granules of a thermoplastic polymer chosen from a propylene homo- and copolymer, a container 3 which can be fed with a dielectric liquid, a feed hopper 4 which can be fed at ambient temperature with granules of the thermoplastic polymer which are contained in the container 2 and with the dielectric liquid contained in the container 3, and an extruder 5 comprising a grooved barrel 6 and/or a barrier screw 7, and also an extruder head 8. The composition comprising the granules of the thermoplastic polymer and the dielectric liquid is introduced via the feed hopper 4 into a feed zone 9 of the screw according to stage i), then conveyed, according to stage ii), from the feed zone 9 towards one or more intermediate zones 10 making possible the transportation of the composition towards the head of the extruder 8 located at the outlet of the extruder 5 and the gradual melting of the thermoplastic polymer, said intermediate zones 10 being located between the feed zone 9 and the extruder head 8. Finally, at the extruder head 8, the composition is applied around an elongated electrically conducting element according to stage iii).

Figure 2:
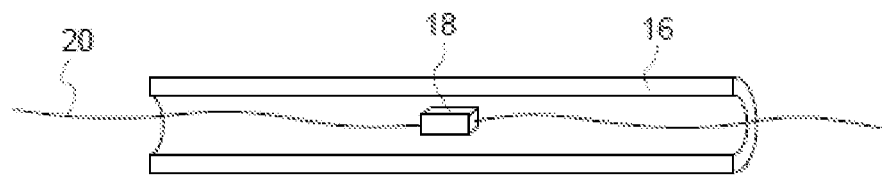

In FIG. 2, the medium- or high-voltage power cable 11, obtained according to the process of the invention, comprises a central elongated electrically conducting element 12, in particular made of copper or of aluminium, and successively and coaxially comprises, around this element 12, a first semiconducting layer 13 known as "internal semiconducting layer", an electrically insulating layer 14, a second semiconducting layer 15 known as "external semiconducting layer", a metal shield 16 of the cylindrical tube type and an exterior protective sheath 17, the electrically insulating layer 14 being obtained from a composition comprising at least one thermoplastic polymer, chosen from a propylene homopolymer and a propylene copolymer, and a dielectric liquid according to an extrusion process as defined in the invention.

The layers 13 and 15 are layers extruded by processes well known to a person skilled in the art.

The presence of the metal shield 16 and of the exterior protective sheath 17 is preferable but not essential. This cable structure is as such of known type and outside the scope of the present invention.

The invention claimed is:
1. A process for the manufacture of an electric cable having at least one elongated electrically conducting element and at least one extruded thermoplastic layer surrounding said elongated electrically conducting element, said process employing a device comprising at least one extruder containing a barrel, a screw and an extruder head, said method comprising steps of:
   i) a stage of introduction of a composition comprising:
      at least one thermoplastic polymer in a solid form chosen from a propylene homopolymer and a propylene copolymer, and
      at least one dielectric liquid, said dielectric liquid representing an amount of less than 15% by weight, with respect to a total weight of the composition, into a first zone of the screw, denoted feed zone, located at an inlet of the extruder;
   ii) a stage during which the composition resulting from stage i) is conveyed from the feed zone towards one or more intermediate zones of the screw, making possible transportation of the composition towards the head of the extruder located at an outlet of the extruder and gradual melting of the thermoplastic polymer; and
   iii) a stage of application, at the head of the extruder, of the composition resulting from stage ii) around the elongated electrically conducting element,
   wherein, the barrel is a grooved barrel and the screw is a barrier screw, wherein said barrier screw has at least one barrier zone with a secondary thread with a greater pitch than a main thread, and with a height lower than said main thread, sufficient to separate the molten polymer from the polymer which is still solid.

2. The process according to claim 1, wherein the propylene copolymer of the composition of stage i) is a heterophasic propylene copolymer, a random propylene copolymer or one of their mixtures.

3. The process according to claim 1, wherein the composition of stage i) additionally comprises a polyethylene in solid form.

4. The process according to claim 1, wherein the dielectric liquid represents from 3% to 10% by weight, with respect to a total weight of the composition.

5. The process according to claim 1, wherein the barrier screw has a nominal diameter D varying from 45 to 200 mm.

6. The process according to claim 1, wherein the barrier screw exhibits an L/D ratio varying from 20 to 26, L denoting a length of the screw in mm and D denoting the nominal diameter of the screw in mm.

7. The process according to claim 1, wherein the diameter of a body of the barrier screw increases from a rear or from the inlet of the extruder towards a front or the outlet of the extruder, either over an entire length of the screw or over parts only of the screw.

8. The process according to claim 1, wherein the grooved barrel comprises at least one grooved part and the grooved part is found in the feed zone of the screw.

9. The process according to claim 8, wherein, during stage i), the composition is introduced directly into a first zone of the feed zone, known as introduction zone, and then the composition is conveyed from the introduction zone towards a second zone of the feed zone, in a direction of the head of the extruder, the grooved part of the barrel being found in the second zone of the feed zone.

10. The process according to claim 1, wherein the grooves of the grooved barrel are triangular conical in shape.

11. The process according to claim 1, wherein the grooves of the grooved barrel have a length varying from 1.5 D to 2.5 D.

12. The process according to claim 1, wherein the device additionally comprises a feed hopper and stage i) is carried out by means of a feed hopper.

13. The process according to claim 1, wherein the barrier screw of the extruder is divided into four zones, the first zone being the feed zone, the second, third and fourth zones being the one or more intermediate zones making possible transportation of the composition towards the head of the extruder located at the outlet of the extruder, and gradual melting of the thermoplastic polymer, at least one of the intermediate zones being a barrier zone.

14. The process according to claim 1, wherein the process additionally comprises, before stage i), a stage $i_0$) in which the thermoplastic polymer in the solid form chosen from a propylene homopolymer and a propylene copolymer is brought into contact with the dielectric liquid in order to form the composition of stage i).

15. The process according to claim 14, wherein, during stage $i_0$), a pressure is at most 5 bars.

16. The process according to claim 14, wherein stage $i_0$) is carried out directly in a feed hopper or in a mixer located upstream of the feed hopper.

17. The process according to claim 1, wherein the barrel is a grooved barrel and the screw is a barrier screw.

* * * * *